United States Patent [19]
Harlan et al.

[11] Patent Number: 5,606,232
[45] Date of Patent: Feb. 25, 1997

[54] DC ON LINE AC BRUSHLESS MOTOR

[75] Inventors: George H. Harlan, Weymouth; John R. Avery, Mansfield, both of Mass.

[73] Assignee: Nidec Corporation, Torrington, Conn.

[21] Appl. No.: 343,115

[22] Filed: Nov. 22, 1994

[51] Int. Cl.$^6$ .................................................. H02P 3/00
[52] U.S. Cl. ........................ 318/138; 318/439; 318/800; 318/254
[58] Field of Search ................................. 318/138, 254, 318/600–636, 800–818; 388/815; 363/32–46, 47, 98; 336/118, 119, 178

[56] References Cited

U.S. PATENT DOCUMENTS

| | | | |
|---|---|---|---|
| 3,612,973 | 10/1971 | Kuniyoshi | 318/254 |
| 4,051,417 | 9/1977 | Fujinawa et al. | 318/138 |
| 4,857,819 | 8/1989 | Maurice et al. . | |
| 4,922,172 | 5/1990 | Roddy et al. . | |
| 4,950,918 | 8/1990 | O'Breartuin et al. . | |
| 5,003,455 | 3/1991 | Miller | 363/87 |
| 5,127,464 | 7/1992 | Butler et al. . | |
| 5,202,612 | 4/1993 | Yoshida et al. | 318/138 |
| 5,220,258 | 6/1993 | Hans et al. . | |
| 5,235,504 | 8/1993 | Sood . | |
| 5,241,257 | 8/1993 | Nordby et al. . | |
| 5,280,228 | 1/1994 | Kanouda et al. | 318/803 |
| 5,293,308 | 3/1994 | Boys et al. | 363/37 |
| 5,317,245 | 5/1994 | Moritz et al. | 318/254 |
| 5,343,129 | 8/1994 | Hans et al. | 318/431 |
| 5,412,293 | 5/1995 | Minezawa et al. | 318/376 |
| 5,420,492 | 5/1995 | Sood et al. | 318/809 |
| 5,436,547 | 7/1995 | Nagai et al. | 318/801 |
| 5,446,354 | 8/1995 | Hiruma | 318/439 |
| 5,457,375 | 10/1995 | Marcinkiewicz et al. | 318/802 |
| 5,463,299 | 10/1995 | Futami et al. | 318/618 |
| 5,483,136 | 1/1996 | Marcinkiewicz | 318/558 |
| 5,483,141 | 1/1996 | Uesugi | 318/811 |

*Primary Examiner*—Paul Ip
*Attorney, Agent, or Firm*—McCormick, Paulding & Huber

[57] ABSTRACT

A phase regulated power supply is provided for converting alternating current (AC) to direct current (DC) for powering a DC brushless motor, such as a fan. The power supply includes a full wave bridge rectifier and a driver circuit, which may be an IC chip, controlled by standard commutation circuitry. An output capacitor is connected electrically downstream to the switch for supplying a reduced DC ripple voltage to the motor load. The power supply preferably includes a line filter for removing input power surges. The speed of the motor may be varied by changing the values of bias resistors used with the driver circuit.

14 Claims, 3 Drawing Sheets

DC ON LINE AC BRUSHLESS MOTOR

BACKGROUND OF THE INVENTION

The present invention relates to a power supply for converting a line source alternating current (AC) to a reduced voltage direct current (DC). More particularly, the present invention relates to a phase regulated AC to DC power supply for powering a brushless DC motor.

Brushless DC motors are known to be both highly efficient and economical. Motors of this type are employed in a number of applications ranging from office equipment to industrial robotics. The home appliance market, however, has yet to take full advantage of the efficiency and cost savings inherent in brushless DC motors. For example, household refrigerators typically include AC motors to operate the compressor, condenser and evaporator, and these motors account for about 20% of the total energy consumed by an average household.

One solution to increase power efficiency in all household appliances using AC motors is to replace such motors with brushless DC motors. For example, if the AC evaporator and condenser motors in a refrigerator are replaced by DC motors the overall power efficiency increases 20%–30%. However, to operate DC motors from a standard 110 volt or 220 volt line source requires an AC to DC power supply. Conventional AC to DC power supplies include line regulated power supplies and switching power supplies. A disadvantage in using a line regulated power supply is that a bulky and expensive line frequency transformer is required. The large size of the power supply is clearly a disadvantage from the standpoint of space conservation, since the power supply cannot fit within the motor housing. While, switching power supplies are generally smaller in size, they include relatively expensive switching components.

Therefore, in response to the foregoing problems, it is an object of the present invention to provide an AC to DC power supply which eliminates the need for a bulky transformer and is small enough to fit within the housing of a brushless DC motor.

It is another object of the present invention to provide an AC to DC power supply which does not utilize the expensive switching components found in prior art power supplies.

SUMMARY OF THE INVENTION

The present invention meets these and other objects by providing a phase regulated AC to DC power supply which does not require either a large, bulky transformer or expensive switching components. Accordingly, a phase regulated power supply is small enough to be contained within the housing of a DC brushless motor. The power supply taught by the present invention comprises interrupting means for periodically interrupting an AC line source to rectify and regulate voltage from the AC line source to provide DC current for the motor. The interrupting means has at least one input port and at least one output port. The input port of the interrupting means is connected electrically downstream to the AC line source. A driver switch is connected electrically downstream to the output port of the interrupting means to supply commutated DC current to the motor. The driver switch has a predetermined opening/closing interval. An output capacitor is connected electrically downstream to the driver switch such that the capacitance of the output capacitor and the interval of opening and closing the switch provide the commutated DC current with a ripple voltage characterized by an average value. The magnitude of the average value of the ripple voltage corresponds to the speed of the motor.

Preferably the power supply includes a filter for protecting the power supply from power surges. In addition, the driver switch may be an IC to further reduce the overall size of the power supply for a more comfortable fit within the motor housing.

According to an embodiment of the invention, the phase regulated power supply comprises an AC line source interrupter for periodically interrupting an AC line source to rectify and regulate voltage from the AC line source and provide DC ripple current for the motor. The interrupter has at least one input port and at least one output port such that the input port of the interrupter is coupled to the AC line source. A voltage level regulator is coupled to the interrupter for regulating the voltage level of the DC ripple current. A driver circuit, used in conjunction with a current commutator, is coupled to the voltage level regulator in order to supply commutated DC ripple current to the motor. A voltage level filter smoothes the regulated DC ripple voltage to power the DC motor.

DETAILED DESCRIPTION OF THE PREFERRED EMBODIMENTS

Figure 1:
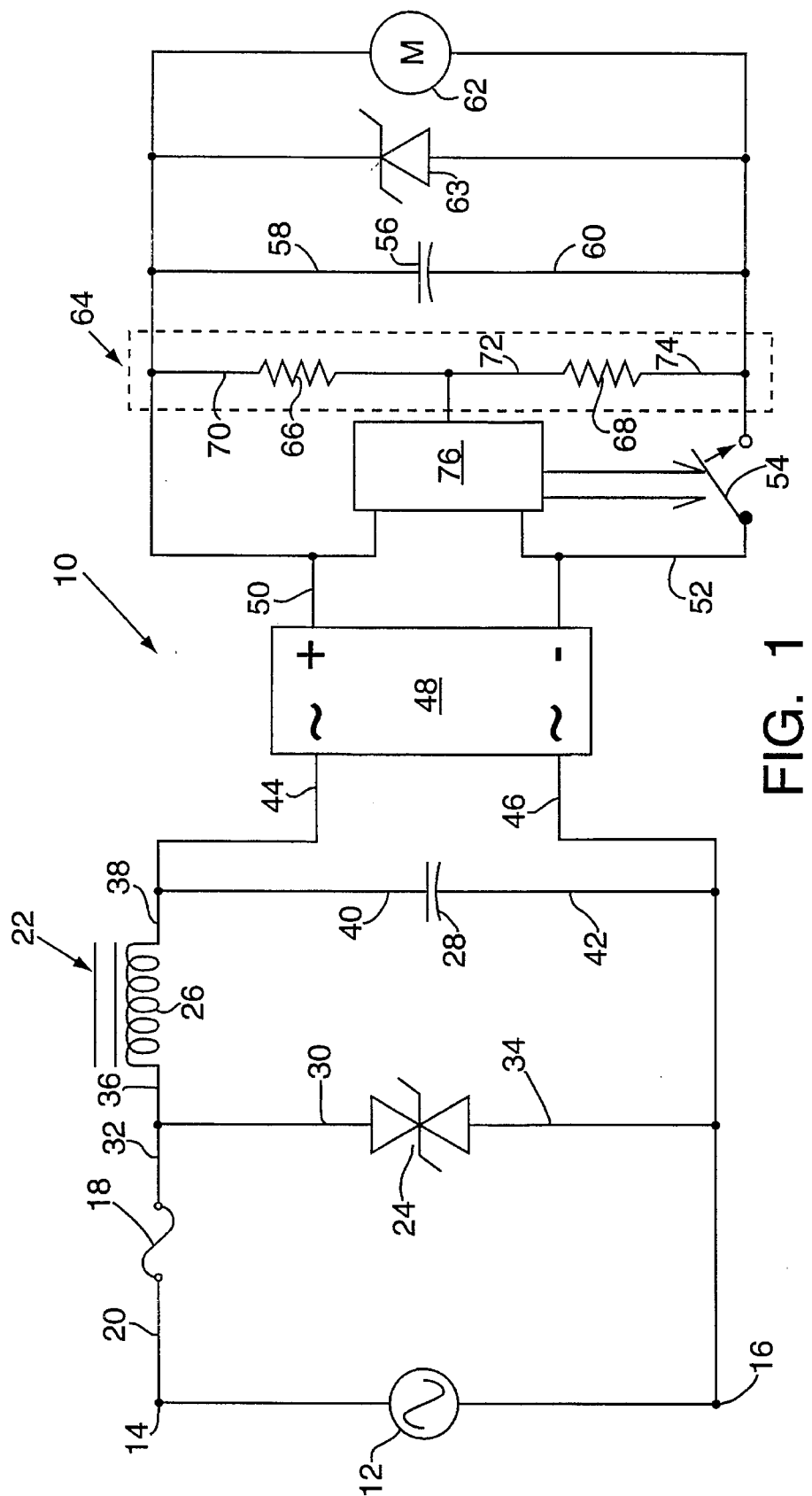
FIG. 1 is a schematic of an AC-DC power supply circuit according to the invention.

FIG. 1 schematically illustrates a phase regulated power supply 10 according to the invention which is ideally suited for powering a DC brushless motor. An AC source 12, typically 120 volts RMS, is supplied to the power supply 10 via supply terminals 14 and 16. A fuse 18 to protect the power supply against power surges has a first end 20 electrically connected to the terminal 14. A suitable filter, such as LC filter 22, further protects the power supply 10 from power surges. In this instance, the filter 22 comprises an inductor 26, and a capacitor 28. A varistor 24 is preferably included for extra power surge protection. However, other suitable components may be used. A first end 30 of the varistor 24 is connected electrically downstream to a second end 32 of the fuse 18, and the varistor 24 is connected at a second end 34 to the terminal 16. A first end 36 of the inductor 26 is connected to the first end 30 of the varistor 24 and to the second end 32 of the fuse 18. A second end 38 of the inductor 26 is connected to a first end 40 of the capacitor 28. The capacitor 28 is connected at a second end 42 to the terminal 16.

The filtered AC line voltage across the capacitor 28 is fed electrically downstream from the filter 22 into input terminals 44 and 46 of a rectifier which is preferably a full wave bridge rectifier, such as 48, or may be a half wave type. The rectifier transforms the AC into a DC voltage present across a positive output terminal 50 and a negative output terminal 52 of the rectifier 48. Of course, the rectifier 48 may be replaced with any means which periodically interrupts the AC line so as to provide rectification and regulation.

An electronic switch 54 having a predetermined opening/closing interval is connected electrically downstream to the positive or negative terminals of the rectifier 48 in order to control the charging of an output capacitor 56. In this instance, the electronic switch 54 is connected to the negative terminal 52 of the rectifier 48.

Preferably, a voltage level adjusting means, in this instance a voltage divider circuit 64, is placed electrically downstream to the rectifier 48 in order to control the speed of a motor load by changing the average voltage level of the output capacitor 56. The voltage divider circuit respectively comprises first and second resistors 66 and 68 which are connected in series with one another. A first end 70 of the first resistor 66 is connected electrically downstream to the positive output terminal 50 of the rectifier 48. A second end of the first resistor 66 is connected to a first end of the second resistor 68 at 72. A second end 74 is connected electrically downstream to the switch 54. Anode 58 of the output capacitor 56 is connected electrically downstream to the voltage divider circuit 64 at 70. Cathode 60 of the output capacitor 56 is connected electrically downstream to the switch 54. The voltage level that the output capacitor 56 is charged to is controlled by commutating circuitry 76 which contains an internal voltage reference. It is connected downstream to the positive terminal 50 of the rectifier 48 and regulates by comparing the voltage level at the junction 72 of resistors 66 and 68 to the internal reference in the commutating circuitry 76. The commutating circuitry determines the actual amount of time the electronic switch is closed.

The capacitance value of the capacitor 56 and the opening/closing interval of the switch 54 is chosen for generating a predetermined average DC voltage for operating the motor. In this case, the rectified current operates a fan motor 62 placed in parallel with the output capacitor 56. The motor is preferably protected from power surges by a reversed biased zener diode 63 which is placed in parallel with the load.

The electronic switch 54 is a current driver for the load. The switch may comprise standard technology such as silicon controlled rectifiers (SCR's), metal oxide field effect transistors (MOSFET's), gated thermal thyristors (GTO's) etc.

A phase regulated approach for powering loads such as DC brushless motors provides inexpensive and precise control of motor speed in applications such as refrigerator cooling fans. It is preferable that the speed of such cooling fans be adjustable in order to maintain a constant cooling temperature in response to varying loads. Other power supply approaches utilizing speed control tend to be expensive and complex. For example, high speed switching power supplies must incorporate sophisticated electronics to change the regulated voltage level. On the other hand, speed control utilizing a phase regulated approach can be accomplished by merely inserting a simple and inexpensive device such as a voltage divider circuit for altering the maximum voltage level for charging the output capacitor.

Another advantage to using a phase regulated approach for powering motors is that no bulky transformers are required. Therefore, a phase regulated power supply such as the one schematically illustrated in FIG. 1 can be easily contained within the motor housing.

Figure 2A:
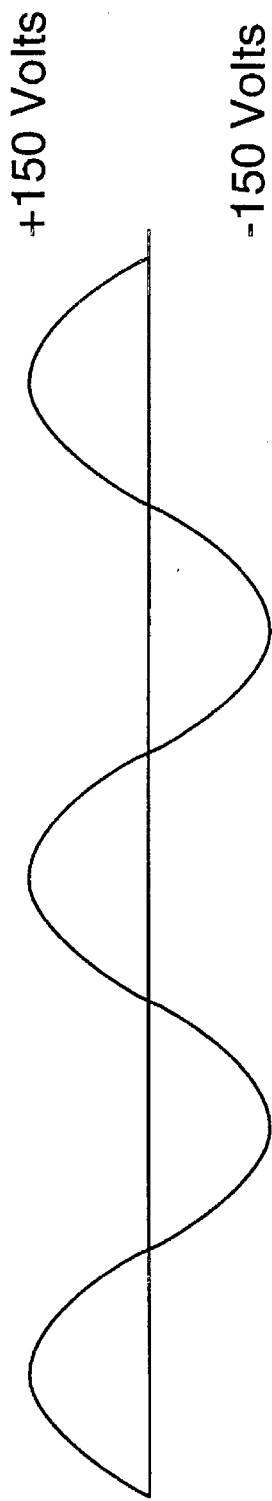
FIGS. 2A through 2B show various signals in the power supply of FIG. 1.
Figure 2B:
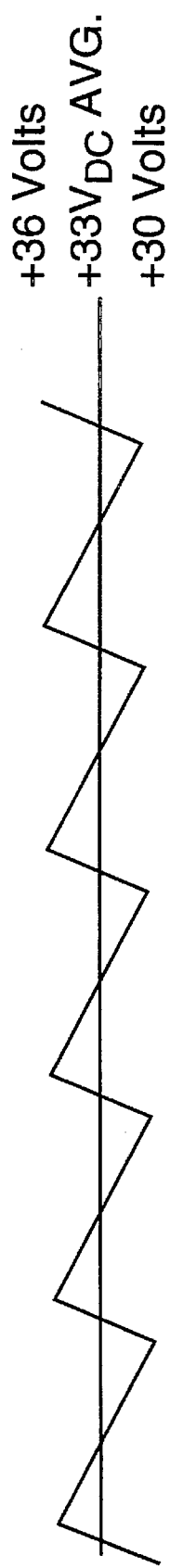

The operation of the phase regulated power supply can be understood in relation to FIGS. 2A–2B. FIG. 2A shows a typical sinusoidal wave form injected across the input terminals 14 and 16 of the power supply 10 of FIG. 1. The wave form has a frequency, of say 60 Hz. corresponding to the standard AC line frequency, and positive and negative peak voltage excursions of +150 volts and −150 volts respectively.

FIG. 2B shows the rectified wave form present across the output capacitor 56. During each half-wave cycle of the rectified signal from the rectifier 48, the output capacitor 56 charges and subsequently discharges. The capacitance of capacitor 56 and the length of time that the switch 54 opens and closes in relation to each half-wave cycle of the rectified wave form determine the average output DC voltage across the output capacitor 56 and the load. With reference to FIG. 2B, the electronic switch 54 is closed as the capacitor is charging. When the voltage across the output capacitor is +36 volts, the switch 54 opens and the capacitor discharges for the remainder of the half cycle. In this case, the value of the capacitance is chosen so that the voltage across the capacitor falls to +30 volts before the switch closes to renew the charging operation during the next half cycle. The relatively steep positive slope depicts the moment in a rectified half cycle that the capacitor 56 is charging. The relatively longer negative slope depicts the moment in the half cycle when the capacitor is discharging. In this instance, the capacitor charges and discharges between a predetermined value of +30 volts and +36 volts. The DC ripple voltage is +6 volts over what appears to be an average DC line voltage of about +33 volts. The reduced DC voltage is used to drive the fan motor 62 of FIG. 1.

Figure 3:
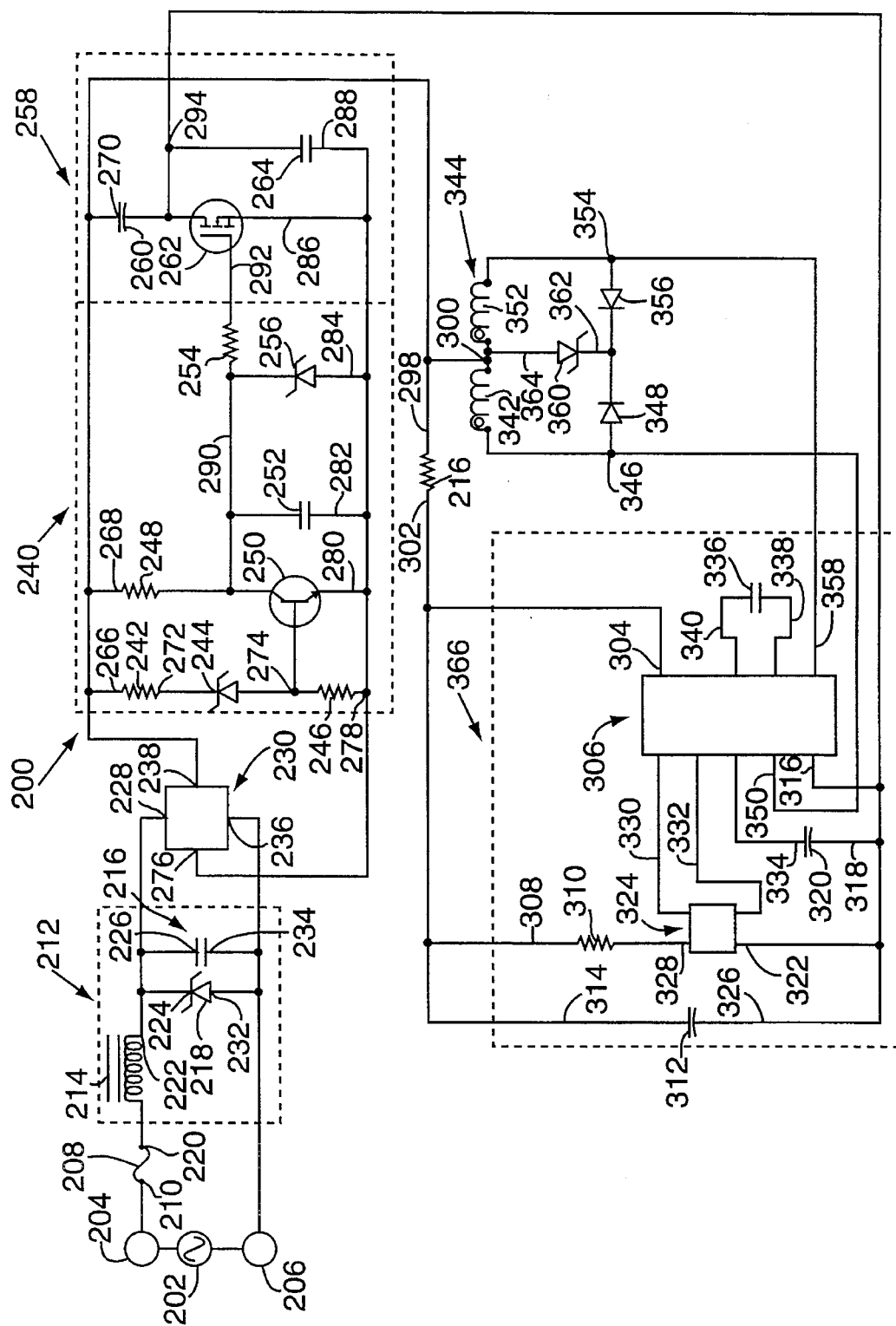
FIG. 3 is a preferred embodiment of the invention of FIG. 1.

A preferred embodiment of the invention is illustrated in FIG. 3. A phase regulated power supply for converting 120 volts AC to a regulated DC voltage for powering a load, such as a DC brushless fan motor (not shown) is generally designated at 200. An AC source 202 supplies the power supply 200 across AC supply terminals 204 and 206. A fuse 208 has a first end 210 connected to the AC supply terminal 204 to protect the power supply 200 from electrical hazards. An input line filter 212 composed of inductor 214, input filter capacitor 216 and a zener diode used as a transient voltage suppresser (TVS) 218 protects the power supply 200 from any input transients that may be induced on the AC source 202. Other components may be substituted in the input line filter 212.

The inductor 214 has a first end connected to a second end of the fuse 208 at 220. The inductor 214 has a second end 222 connected to the TVS 218 at a cathode 224 of the TVS 218, the input filter capacitor 216 at a first end 226 and to a first AC input 228 of a diode bridge rectifier 230. The AC supply terminal 206 is connected to the TVS 218 at its anode 232, the input filter capacitor 216 at a second end 234 and a second AC input 236 of the diode bridge rectifier 230.

A positive full wave rectified output 238 of the diode bridge rectifier 230 is fed downstream to an input level detector and driver circuitry 240 comprising resistor 242, zener diode 244, resistor 246, resistor 248, transistor 250, capacitor 252 resistor 254, and zener diode 256. A power switch and output filter circuitry 258 comprises an output filter capacitor 260, power metal oxide, field effect transistor. (MOSFET or FET) 262 and capacitor 264. The positive output 238 of the bridge rectifier 230 is connected to a first end 266 of the resistor 242, to a first end 268 of the resistor 248 and a positive end 270 of the output filter capacitor 260. A second end of the resistor 242 is connected to a cathode end of the zener diode 244 at 272. An anode end of the zener diode 244 is connected to a first end of the resistor 246 and a base of the transistor 250 at junction 274. A negative full wave rectified output 276 of the diode bridge 230 is connected downstream to a second end 278 of the resistor 246, an emitter 280 of the transistor 250, a second end 282 of the capacitor 252, an anode 284 of the zener diode 256, a source 286 of the FET 262 and a first end 288 of the capacitor 264. A second end of the resistor 248 is connected to a collector of the transistor 250, a first end of the capacitor 252, a cathode of the zener diode 256 and a first end of the resistor 254 at junction 290. A second end of the resistor 254 is connected to a gate pin 292 of the FET 262. A negative end of the output filter capacitor 260 is connected to a drain pin of the FET 262 and a second end of the capacitor 264 at reference point 294 which will be referenced as the negative output of the phase regulator.

The positive full wave rectified output 238 from the diode bridge rectifier 230 is monitored by the resistor 242, the zener diode 244, and the resistor 246. The zener diode 244 conducts at its zener voltage of 33 volts. As the incoming rectified line voltage at 266 exceeds 33 volts, the zener diode 244 begins to conduct to turn on the transistor 250. The voltage at the junction 290 is then lowered from 12 volts, controlled by the zener diode 256, to about 0.3 volts, thereby causing the FET 262 to turn off until the input voltage being fed from the bridge rectifier 230 falls from a peak of 170 volts to 33 volts. When the input rectified voltage drops below 33 volts, the zener diode 244 stops conducting so that the transistor 250 turns off. As the transistor 250 starts to turn off the voltage at the junction 290 begins to rise so as to charge the capacitor 252 via the resistor 248. The voltage level present at the junction 290 will continue to rise until the voltage is clamped at 12 volts by the zener diode 256. The FET 262 begins to conduct at a gate potential of 2.5 volts and is completely turned on at a gate potential of 10 volts. As the FET 262 is being turned on, current is flowing into the capacitor 260. As the capacitor 260 continues to charge, its average voltage rises from a minimum of 30 volts to a peak of 36 volts for an average of 33 volts between points 294 (ground) and 270 (+33 volts). An output voltage across points 294 and 270 is regulated at 33 volts with about 6 volts of ripple peak-to-peak. This output voltage is held fairly constant over a swing of the AC input voltage from 85 to 135 volts. The output voltage is corrected at a rate of once every 8.67 milliseconds when using an AC line frequency of 60 Hertz. This is achieved by varying the amount of time that the FET 262 is left on and the capacitor 260 is allowed to charge.

The positive end of the capacitor 260 at 270 is connected to a dropping resistor 296 at a first end 298 and to a center tap winding of a motor phase winding at 300. A second end 302 of the resistor 296 is connected at 304 to pin 10 of a IC LB1663 motor driver 306, a first end 308 of a resistor 310 and the positive end of a capacitor 312 at 314.

The reference point 294 is connected to a ground terminal 316 of the motor driver IC 306, to a negative end 318 of a capacitor 320, to a ground terminal 322 of Hall cell 324 and to the negative end 326 of the capacitor 312. A second end of the resistor 310 is connected to a positive input pin of the Hall cell 324 at 328. A negative output 330 of the Hall cell 324 is connected to pin 1 of the motor driver IC 306, and a positive output 332 of the Hall cell is connected to pin 2. A positive end 334 of the capacitor 320 connects to pin 3 of the motor controller IC 306. A capacitor 336 is connected to the driver circuit between pin 7 at 338 and pin 8 at 340. A first phase 342 of a motor 344 is connected to an anode 346 of diode 348 and to pin 4 of the motor driver IC 306 at 350. A second phase 352 is connected to an anode 354 of diode 356 and to pin 6 of the motor driver IC 306 at 358. Cathodes of the diodes 348 and 356 are connected to a cathode of a zener diode 360 at a junction 362. An anode 364 of the zener diode 360 is connected to the center tap winding 300 of the motor.

A motor driver 366 comprises two major components, the Hall cell 324 and the motor driver IC 306. These are both powered off of the 33 volt output 270 through the dropping resistor 296. This voltage is regulated at 6.8 volts by the IC's 306 own internal regulator accessed via pin 10 at 304. The Hall cell 324 is driven by a constant voltage source which is connected through the resistor 310 to the IC's internal regulator at 304. The Hall cell has two complementary output terminals 330 and 332 which are directly tied to the motor driver IC 306. These two terminals provide a voltage which is proportional to the magnetic field intensity of the permanent magnets in the motor's cup. This variation in flux level is sensed twice per revolution of the DC brushless motor and provides the commutating signal to the driver IC 306. In addition to commutating the motor, the driver IC provides two safety mechanisms to protect the motor. The first is a thermal shut down control which protects the motor against over heating. The second is protection for locked rotor with an automatic restart. The IC also contains a rotation detect alarm and radio interference reduction pins which have the capacitor 336 connected across them. The radio interference reduction feature reduces the amount of electromagnetic interference (EMI) produced when each of the motor windings 342 and 352 is turned off. An internal stall timer is programmed by the capacitor 320 which sets the lock detect time to 2 seconds and then switches the motor off for 6 seconds and tries to restart for 1 second. The motor will cycle continuously until motion is detected. The two phase windings of the motor are driven directly from the motor driver IC 306 pin 4 at 350 and pin 6 at 358. These driver pins are rated at 1.5 amps and 85 volts. Each output is protected by a clamping network comprising diodes 348, 356 and 360. The actual switched motor current is approximately 100 mA. Each output is clamped at a level of 43 volts above the supply voltage of 33 volts.

The operation of the phase regulated power supply 200 of FIG. 3 will now be explained in detail. The power supply 200 generates 33 volts DC and serves as a unipolar brushless DC motor driver. The power supply is called a phase regulated power supply which regulates directly off the incoming alternating current line. The 120 volt input is fused to the high side of the AC line by a 2.5 amp fuse 208. The incoming power is filtered by an LC tank circuit comprising a 52 mH inductor 214 and a 0.1 uF, 250 volt metallized polyester capacitor 216. A 0.1 uF, 250 volt rated transient voltage suppresser 218 (TVS) is installed directly across the input filter. The TVS is also rated at 600 watts peak pulsed power and has a maximum clamping voltage of 274 volts so as to protect the power supply circuitry against incoming transients that appear on the AC line caused either by electromechanical switching or natural causes such as lightning. The incoming waveform is rectified by a 600 volt, 2 amp diode bridge rectifier 230.

The power converter stage comprises a voltage level detector 240 and a power switch 258. The level detector monitors the full wave rectified voltage waveform coming from the bridge rectifier and when the rectified waveform reaches 33 volts the level detector turns on a transistor 250 which is used to gate the power FET 262 switch off. The power FET is switched back on again as the rectified input voltage falls below 33 volts again. The FET is commutated 120 times per second corresponding to a line frequency of 60 Hertz. This chopped voltage component is then averaged by a 180 uF, 50 volt filter capacitor 260 which reduces the ripple voltage to 1 volt peak-to-peak. The filter capacitor has a temperature rating of −50 to +105 C and has its ripple current derated to 30% of its rated value. The power MOSFET has a 400 volt rating and is derated to 35% of its rated voltage. It has a 0.01 uF, 1000 volt snubber capacitor installed across it from drain to source for additional transient voltage protection.

The motor driver circuit is comprised of two major components, a Hall cell and a two-phase brushless motor driver IC. All of these are supplied power off of the 33 volt source through a dropping resistor 296 and is regulated by the motor driver IC's internal 6.8 volt shunt regulator. The Hall cell is driven by a constant voltage source which is connected by a 4.7K Ohm resistor 310 to the 6.8 volt regulator source.

The operating range of the power converter section is from a minimum AC input voltage of 85 volts to a maximum of 135 volts. This produces a consistent 33 volts to drive the motor at a speed of 1250 revolutions per minute. The typical input power requirement is about 4.50 watts. The typical motor current at 33 volts is 110 ma, or 3.63 watts of drive power. This gives a conversion efficiency of 80%.

While the present invention has been described in the above preferred embodiment, it will be understood that numerous modifications and substitutions can be made without departing from the spirit of the invention. For instance, other. appropriate filters and commutation devices may be substituted for the input filter and Hall cell shown in the preferred embodiment. Furthermore, the phase regulated power supply may be employed in other applications and need not be limited to that of fans. Accordingly, the present invention has been described in a preferred embodiment by way of illustration, rather than limitation.

We claim:

1. A phase regulated power supply to be contained in the housing of a DC brushless motor for converting alternating current (AC) to direct current (DC) to power the motor, the power supply comprising:

interrupting means for periodically interrupting an AC line source to rectify and regulate voltage from the AC line source to provide DC current for the motor, the interrupting means to be electrically coupled downstream to said AC line source;

a power converter stage having first and second input terminals, the power converter stage being coupled electrically downstream of said interrupting means to supply voltage-regulated DC current to the motor, said power converter stage including:

a voltage level detector coupled to the first and second input terminals of the power converter stage to receive a rectified waveform from the interrupting means, the voltage level detector including a first switch responsive to the voltage across the input terminals of the power converter stage, the first switch being turned off and passing substantially no voltage to an output of the first switch when the voltage across the terminals of the power converter stage is below a first predetermined threshold, and being turned on and passing a voltage above a second predetermined threshold when the voltage across the terminals of the power converter stage is above the first predetermined threshold, a second switch having a control terminal coupled to the output terminal of the first switch for turning on the second switch when the voltage at the control terminal of the second switch is above the second predetermined threshold, the second switch having input and output terminals, the second switch input terminal being coupled to the first input terminal of the power converter stage via a resistive member, and the second switch output terminal being coupled to the second input terminal of the power converter stage, the voltage level at the input terminal of the second switch being above a third predetermined threshold when the second switch is turned off and below the third predetermined threshold when the second switch is turned on; and a power switch stage coupled electrically downstream of the power converter stage, the power switch stage including a third switch for charging a voltage-averaging capacitive element, the third switch having a control input responsive to the voltage level of the input terminal of the second switch, the third switch further including input and output terminals, the input terminal of the power switch being coupled to the first terminal of the power converter stage via the voltage-averaging capacitive element, the output terminal of the third switch being coupled to the second terminal of the power converter stage, the third switch being turned on for charging the capacitive element when the voltage at its control input is above the third predetermined threshold, and the third switch being turned off for discharging the capacitive element when the voltage at its control input is below the third predetermined threshold, the capacitive element generating a predetermined average ripple DC voltage based on the capacitance of the capacitive element and the amount of time the third switch is on; and a motor driver stage coupled electrically downstream of the power converter stage for driving the motor in response to the average voltage level generated by the power converter stage.

2. A phase regulated power supply as defined in claim 1, wherein the first switch is a zener diode, the cathode of the zener diode being coupled to the first terminal of the power converter stage, and the anode of the zener diode being coupled to the control terminal of the second switch.

3. A phase regulated power supply as defined in claim 1, wherein the second switch is a transistor.

4. A phase regulated power supply as defined in claim 3, wherein the transistor is of the bipolar junction type.

5. A phase regulated power supply as defined in claim 1, wherein the third switch is a power field effect transistor.

6. A phase regulated power supply as defined in claim 1, wherein the interrupting means is a full-wave bridge rectifier.

7. A phase regulated power supply as defined in claim 1, wherein the motor driver stage includes an LB 1663 integrated circuit motor driver.

8. A phase regulated power supply as defined in claim 1, wherein the motor driver stage includes a hall cell for commutating current to a brushless DC motor.

9. A phase regulated power supply to be contained in the housing of a DC brushless motor for converting alternating current (AC) to direct current (DC) to power the motor, the power supply comprising:

a bridge rectifier for periodically interrupting an AC line source to rectify and regulate voltage from the AC line source to provide DC current for the motor, the bridge rectifier to be electrically coupled downstream to said AC line source;

a power converter stage having first and second input terminals, the power converter stage being coupled electrically downstream of said interrupting means to supply voltage-regulated DC current to the motor, said power converter stage including:

a voltage level detector coupled to the first and second input terminals of the power converter stage to receive a rectified waveform from the bridge rectifier, the voltage level detector including a zener diode including a cathode coupled to the first terminal of the power converter stage and an anode coupled to the second terminal of the power converter stage via a resistive member, the zener diode being non-conductive and passing substantially no voltage to its anode when the voltage across the terminals of the power converter stage is below a first predetermined threshold, and being conductive and passing to its anode a voltage above a second predetermined threshold when the voltage across the terminals of the power converter stage is above the first predetermined threshold, a transistor switch having a control terminal coupled to the anode of the zener diode for turning on the transistor when the voltage at the control terminal of the transistor switch is above the second predetermined threshold, the transistor switch having input and output terminals, the transistor switch input terminal being coupled to the first input terminal of the power converter stage via a resistive member, and the transistor switch output terminal being coupled to the second input terminal of the power converter stage, the voltage level at the input terminal of the transistor switch being above a third predetermined threshold when the transistor switch is turned off and below the third predetermined threshold when the transistor switch is turned on; and a power switch stage coupled electrically downstream of the power converter stage, the power switch stage including a power transistor for charging a voltage-averaging capacitor, the power transistor having a control input responsive to the voltage level of the input terminal of the transistor switch, the power transistor further including input and output terminals, the input terminal of the power transistor being coupled to the first terminal of the power converter stage via the voltage-averaging capacitor, the output terminal of the power transistor being coupled to the second terminal of the power converter stage, the power transistor being turned on for charging the capacitor when the voltage at its control input is above the third predetermined threshold, and the power transistor being turned off for discharging the capacitor when the voltage at its control input is below the third predetermined threshold, the capacitor generating a predetermined average ripple DC voltage based on its capacitance and the amount of time the capacitor is on; and a motor driver stage coupled electrically downstream of the power converter stage for driving the motor in response to the average voltage level generated by the power converter stage.

10. A phase regulated power supply as defined in claim 9, wherein the transistor switch is of the bipolar junction type.

11. A phase regulated power supply as defined in claim 9, wherein the power transistor is of the field effect type.

12. A phase regulated power supply as defined in claim 9, wherein the bridge rectifier is of the full-wave type.

13. A phase regulated power supply as defined in claim 9, wherein the motor driver stage includes an LB 1663 integrated circuit motor driver.

14. A phase regulated power supply as defined in claim 9, wherein the motor driver stage includes a hall cell for commutating current to a brushless DC motor.

\* \* \* \* \*